(12) United States Patent
Hong

(10) Patent No.: US 11,337,082 B2
(45) Date of Patent: May 17, 2022

(54) WIRELESS BACKHAUL CONNECTION METHOD AND DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/072,660

(22) Filed: Oct. 16, 2020

(65) Prior Publication Data
US 2021/0037398 A1 Feb. 4, 2021

Related U.S. Application Data

(63) Continuation of application No. PCT/CN2018/084293, filed on Apr. 24, 2018.

(51) Int. Cl.
*H04W 24/10* (2009.01)
*H04W 16/32* (2009.01)
*H04W 84/04* (2009.01)
*H04W 92/04* (2009.01)

(52) U.S. Cl.
CPC .......... *H04W 16/32* (2013.01); *H04W 24/10* (2013.01); *H04W 84/047* (2013.01); *H04W 92/04* (2013.01)

(58) Field of Classification Search
CPC .. H04W 16/32; H04W 28/0226; H04W 24/10
See application file for complete search history.

(56) References Cited

U.S. PATENT DOCUMENTS

| 8,134,979 | B2 | 3/2012 | Jin et al. | |
|---|---|---|---|---|
| 8,254,943 | B1 * | 8/2012 | Dinan | H04W 24/04 455/450 |
| 8,918,108 | B2 * | 12/2014 | Arad | H04W 16/02 455/446 |
| 8,964,626 | B2 * | 2/2015 | Seo | H04L 5/0007 370/315 |

(Continued)

FOREIGN PATENT DOCUMENTS

| CN | 101132601 A | 2/2008 |
|---|---|---|
| CN | 101345675 A | 1/2009 |

(Continued)

OTHER PUBLICATIONS

AT&T, Qualcomm, Samsung, New SID Proposal: Study on Integrated Access and Backhaul for NR Approval, 3GPP TSG RAN Meeting #75 RP-170821, Dubrovnik, Croatia, Mar. 6-9, 2017, 5 pages.

(Continued)

*Primary Examiner* — Qutbuddin Ghulamali
(74) *Attorney, Agent, or Firm* — Finnegan, Henderson, Farabow, Garrett & Dunner, L.L.P.

(57) ABSTRACT

A wireless backhaul connection method, applied to an LTE base station, includes: receiving device type reporting information sent by a wireless backhaul base station located in a coverage of the LTE base station, the device type reporting information indicating that a device type of the wireless backhaul base station is a wireless backhaul type; and configuring, for the wireless backhaul base station according to the device type reporting information, a secondary base station used for the wireless backhaul connection.

18 Claims, 15 Drawing Sheets

(56) References Cited

U.S. PATENT DOCUMENTS

| | | | | |
|---|---|---|---|---|
| 2007/0110005 | A1* | 5/2007 | Jin | H04W 92/20 370/335 |
| 2013/0148558 | A1* | 6/2013 | Malladi | H04W 52/0219 370/311 |
| 2015/0181455 | A1* | 6/2015 | Song | H04W 72/0446 455/452.1 |
| 2015/0341838 | A1* | 11/2015 | Pinheiro | H04L 5/0035 455/449 |
| 2016/0073273 | A1* | 3/2016 | Li | H04W 16/06 455/449 |
| 2016/0294533 | A1* | 10/2016 | Ridel | H04B 1/525 |
| 2017/0063502 | A1* | 3/2017 | Fukuta | H04W 36/0072 |
| 2017/0311378 | A1 | 10/2017 | Tsuda | |
| 2018/0332658 | A1 | 11/2018 | Tsuda | |
| 2019/0281659 | A1 | 9/2019 | Tsuda | |

FOREIGN PATENT DOCUMENTS

| | | |
|---|---|---|
| CN | 102036406 A | 4/2011 |
| CN | 102056242 A | 5/2011 |
| CN | 103731897 A | 4/2014 |
| CN | 105072647 A | 11/2015 |
| EP | 2 306 766 A1 | 4/2011 |

OTHER PUBLICATIONS

ZTE, Discussion on relay architecture supporting IAB, 3GPP TSG-RAN WG3 Meeting #99 R3-180792, Athens, Greece, Feb. 26-Mar. 2, 2018, 10 pages.

International Search Report in the International Application No. PCT/CN2018/084293, dated Jan. 22, 2019.

Written Opinion of the International Searching Authority in the International Application No. PCT/CN2018/084293, dated Jan. 22, 2019.

Qualcomm Incorporated, "Integrated Access and Backhaul Architectures", 3GPP TSG-RAN WG3 Meeting #99, R3-181078, Athens, Greece, Jan. 26-Mar. 2, 2018, 5 pages.

First Office Action in Chinese Application No. 201880000438.6, dated Jun. 16, 2021.

Extended European Search Report dated Nov. 5, 2021, from the European Patent Office issued in counterpart European Application No. 18916462.7.

Teyeb, O. et al., "Dynamic Relaying in 3GPP LTE-Advanced Networks", EURASIP Journal on Wireless Communications and Networking, vol. 2009, No. 1, Jan. 1, 2009, Article ID 731317, 11 pgs.

Samsung, "Evaluation Methodology for NR IAB", R1-1805274, 3GPP TSG RAN WG1 Meeting #92bis, Sanya, China, Apr. 16-20, 2018, 8 pgs.

\* cited by examiner

WIRELESS BACKHAUL CONNECTION METHOD AND DEVICE

CROSS-REFERENCE TO RELATED APPLICATIONS

The present application is a continuation of International Application No. PCT/CN2018/084293 filed on Apr. 24, 2018, the content of which is hereby incorporated by reference in its entirety.

TECHNICAL FIELD

The present disclosure generally relates to the field of communication technology, and more particularly, to a method and apparatus for wireless backhaul connection.

BACKGROUND

In a new generation of communication system, in order to meet the requirements of diversified, high-speed, and large number of network services, the spectrum efficiency needs to be greatly improved, and the high-frequency communication technology is an important candidate technology to meet the needs of the new generation of communication system to improve the spectrum efficiency.

Due to the transmission characteristics in high frequency bands, small cells are generally used for high frequency communication. However, if each small cell is configured with a traditional wired backhaul, such as optical fibers, it may result in great expenses, especially in areas where optical fibers may not be deployed, which may cause poor communication in the areas.

SUMMARY

According to a first aspect of embodiments of the present disclosure, a method for wireless backhaul connection, applied in a long-term evolution (LTE) base station, includes: receiving device type reporting information sent by a wireless backhaul base station located in a coverage of the LTE base station, wherein the device type reporting information is configured to indicate that a device type of the wireless backhaul base station is a wireless backhaul type; and configuring, for the wireless backhaul base station according to the device type reporting information, a secondary base station used for the wireless backhaul connection.

According to a second aspect of embodiments of the present disclosure, a method for wireless backhaul connection, applied in a wireless backhaul base station, includes: generating device type reporting information, wherein the device type reporting information is configured to indicate that a device type of the wireless backhaul base station is a wireless backhaul type; and sending the device type reporting information to a long term evolution (LTE) base station, wherein the wireless backhaul base station is located in a coverage of the LTE base station, and the LTE base station configures, for the wireless backhaul base station according to the device type reporting information, a secondary base station used for wireless backhaul connection.

According to a third aspect of embodiments of the present disclosure, a long-term evolution (LTE) base station includes: a processor; and a memory for storing instructions executable by the processor, wherein the processor is configured to: receive device type reporting information sent by a wireless backhaul base station located in a coverage of the LTE base station, wherein the device type reporting information is configured to indicate that the device type of the wireless backhaul base station is a wireless backhaul type; and configure, for the wireless backhaul base station according to the device type reporting information, a secondary base station used for the wireless backhaul connection.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only for the purpose of describing exemplary embodiments, and are not intended to limit the present disclosure. For example, although the terms first, second, third, etc. may be used in this disclosure to describe various information, the information should not be limited to these terms. These terms are only used to distinguish the same type of information from each other. For example, without departing from the scope of the present disclosure, first information may also be referred to as second information, and similarly, second information may also be referred to as first information.

Figure 1:
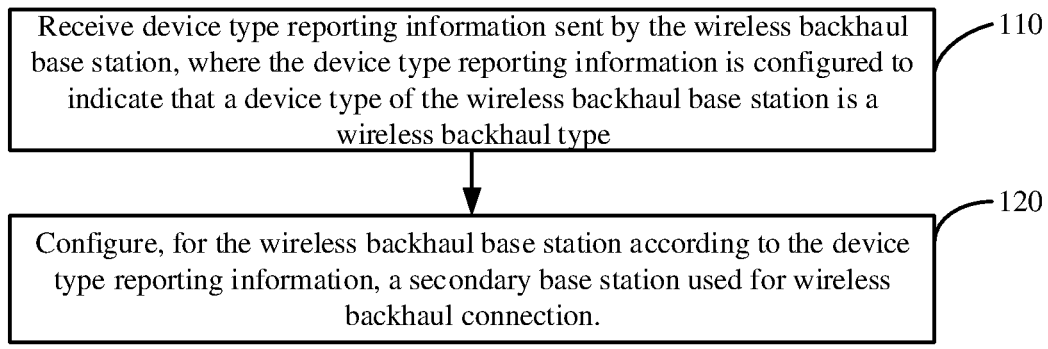
FIG. 1 is a flow chart of a method for wireless backhaul connection according to an exemplary embodiment.

FIG. 1 is a flowchart of a method for wireless backhaul connection according to an exemplary embodiment. For example, the method for wireless backhaul connection may be applied in a Long Term Evolution (LTE) base station having a coverage within which a wireless backhaul base station is located. As shown in FIG. 1, the method for wireless backhaul connection includes the following operations.

In operation 110, device type reporting information sent by the wireless backhaul base station is received, where the device type reporting information is configured to indicate that a device type of the wireless backhaul base station is a wireless backhaul type.

In an embodiment, the LTE base station may be a macro base station with a wide coverage, and the wireless backhaul base station may be a New Radio (NR) small base station that can transmit data to the core network device only by means of the LTE base station or a secondary base station, which may also be referred to as an auxiliary base station, configured by the LTE base station for this wireless backhaul base station.

When the wireless backhaul base station needs the secondary base station to assist in transmitting data, the wireless backhaul base station may generate device type reporting information configured to indicate that the device type of the wireless backhaul base station is a wireless backhaul type, and send the device type reporting information to the LTE base station, so that after receiving the device type reporting information, the LTE base station may configure the secondary base station used for wireless backhaul connection for the wireless backhaul base station.

In addition, the device type reporting information may be received by the LTE base station during a random access process initiated by wireless backhaul services, for example, a random access request message includes the device type reporting information; or the device type reporting information may be received after the random access process initiated by the wireless backhaul services is completed, for example, a Radio Resource Control (RRC) message includes the device type reporting information.

In operation 120, a secondary base station used for wireless backhaul connection is configured for the wireless backhaul base station according to the device type reporting information.

In an embodiment, after the LTE base station receives the device type reporting information, it can be determined according to the device type reporting information that the device type of the wireless backhaul base station is a wireless backhaul type, and it can also be determined that the wireless backhaul base station requires the LTE base station to configure the secondary base station used for the wireless backhaul connection for it. In this way, the wireless backhaul base station may transmit its own data to the core network device through the secondary base station.

Figure 2:
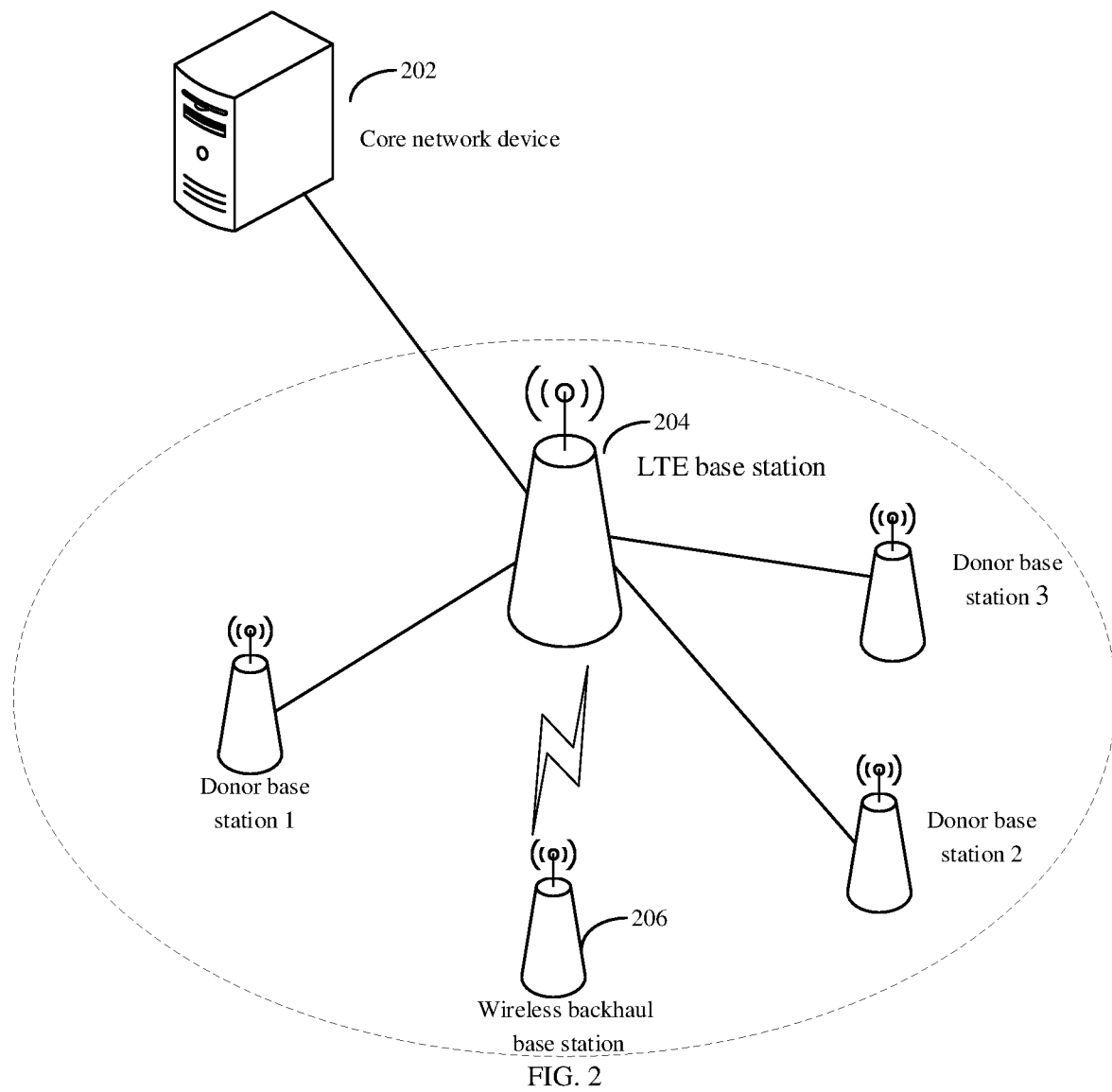
FIG. 2 is a diagram of an application scenario of a method for wireless backhaul connection according to an exemplary embodiment.

FIG. 2 is a schematic diagram of an application scenario of the method for wireless backhaul connection according to an exemplary embodiment. As shown in FIG. 2, the application scenario may include a Non-Standalone (NSA) architecture, including a core network device 202, an LTE base station 204, donor base stations such as a donor base station 1, a donor base station 2, a donor base station 3, and a wireless backhaul base station 206. The core network device 202 is outside the coverage of the LTE base station 204, and the donor base station 1, the donor base station 2, the donor base station 3 and the wireless backhaul base station 206 are all within the coverage of the LTE base station 204.

In an embodiment, a wired connection may be established between the LTE base station 204 and the core network device 202, a wired connection may be established between LTE base station 204 and each of the donor base station 1, the donor base station 2 and the donor base station 3, and a wireless connection may be established between LTE base station 204 and the wireless backhaul base station 206. In addition, a wired backhaul connection may be established between the LTE base station 204 and each of the donor base station 1, the donor base station 2, and the donor base station 3, and a wireless backhaul connection may be established between the LTE base station 204 and the wireless backhaul base station 206.

In addition, the LTE base station 204 may be a macro base station with a wide coverage. The donor base station 1, the donor base station 2, and the donor base station 3 may all be an NR small base station, but they can help the wireless backhaul base station 206 to transmit data to the core network device. The wireless backhaul base station 206 may also be an NR small base station, but it may transmit data to the core network device 202 only by means of an LTE base station (a primary base station for providing wireless backhaul services) or a secondary base station configured by an LTE base station for the wireless backhaul base station (for example, the LTE base station configures the donor base station 1 as the secondary base station).

When the wireless backhaul base station 206 needs to connect to the secondary base station used for wireless backhaul connection, it may generate device type reporting information configured to indicate that the device type of the wireless backhaul base station is wireless backhaul type, and send the device type reporting information to the LTE base station 204, so that after the LTE base station 204 receives the device type reporting information, it may configure, for the wireless backhaul base station 206 according to preset rules, the secondary base station used for wireless backhaul connection. For example, the LTE base station 204 selects or designates one or more donor base stations from the donor base station 1, the donor base station 2, and the donor base station 3 as the secondary base stations configured for the wireless backhaul base station 206.

In the above embodiment, the device type reporting information sent by the wireless backhaul base station is received, wherein the device type reporting information is configured to indicate that the device type of the wireless backhaul base station is a wireless backhaul type, and the secondary base station used for the wireless backhaul connection is configured for the wireless backhaul base station according to the device type reporting information. In this way, the wireless backhaul base station may transmit data to the core network device by means of the secondary base station configured by LTE, thereby improving the reliability of the wireless backhaul connection and improving the data transmission efficiency of the wireless backhaul base station.

Figure 3:
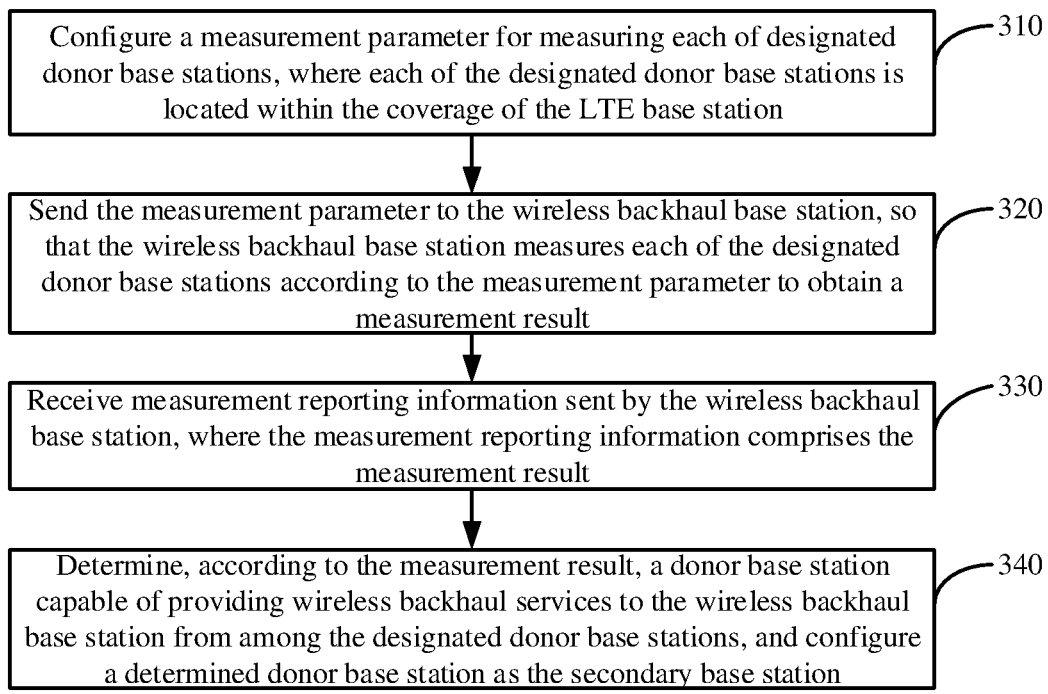
FIG. 3 is a flow chart of a method for wireless backhaul connection according to an exemplary embodiment.

FIG. 3 is a flowchart of a method for wireless backhaul connection according to an exemplary embodiment. The method for wireless backhaul connection may be applied in the LTE base station having a coverage within which a wireless backhaul base station is located. The method is based on the method shown in FIG. 1, and the coverage of the LTE base station also includes multiple donor base stations. Each of the donor base stations and the wireless backhaul base station may be an NR small base station. As shown in FIG. 3, when operation 120 is performed, a donor base station capable of providing wireless backhaul services to the wireless backhaul base station may be determined from among the designated donor base stations according to the measurement result of the wireless backhaul base station, and the determined donor base station may be configured as a secondary base station, and operation 120 may further include the following operations.

In operation 310, a measurement parameter used to measure each of designated donor base stations is configured, where each of the designated donor base stations is located within the coverage of the LTE base station.

In an embodiment, the designated donor base stations may include all or a part of the donor base stations within the coverage of the LTE base station. Whether the designated donor base stations are all or a part of the donor base stations, may be determined autonomously by the LTE base station based on the actual situation. For example, as shown in FIG. 2, the designated donor base stations may include the donor base station 1, the donor base station 2, and the donor base station 3, or may include the donor base station 1 and the donor base station 2.

In an embodiment, the measurement parameter may include at least one of: a list of designated donor base stations, the list of designated donor base stations including each of the designated donor base stations; measurement quantity of designated measurement; or a trigger condition for the designated measurement.

In an embodiment, the measurement quantity of designated measurement may include: a reference signal receiving power (RSRP), or a reference signal receiving quality (RSRQ).

In an embodiment, the measurement quantity of designated measurement may include: a load size.

In an embodiment, the measurement quantity of designated measurement may include: an RSRP or an RSRQ, and a load size.

In an embodiment, a trigger condition for the designated measurement includes triggering on a periodic basis or triggering by an event. The triggering on a periodic basis refers to triggering measurement reporting according to a certain time period, such as 1 minute; triggering by an event refers to triggering measurement reporting when a designated event happens, such as an RSRP measurement value or an RSRQ measurement value of a donor base station exceeds a certain threshold.

In operation 320, the measurement parameter is sent to the wireless backhaul base station, so that the wireless backhaul base station measures each of the designated donor base stations according to the measurement parameter to obtain the measurement result.

In an embodiment, the measurement quantity of the designated measurement includes an RSRP or an RSRQ. Accordingly, the wireless backhaul base station measures the RSRP or RSRQ of each of the designated donor base stations, where the obtained measurement result includes the RSRP measurement value or the RSRQ measurement value of each of the designated donor base stations.

In an embodiment, the measurement quantity of the designated measurement includes the load size. Accordingly, the wireless backhaul base station measures the load size of each of the designated donor base stations, where the obtained measurement result includes the load measurement value of each of the designated donor base stations.

In an embodiment, the measurement quantity of the designated measurement includes an RSRP or an RSRQ and a load size. Accordingly, the wireless backhaul base station measures the RSRP or RSRQ and the load size of each of the designated donor base stations, where the obtained measurement result includes the RSRP measurement value or the RSRQ measurement value of each of the designated donor base stations, and the load measurement value of each of the designated donor base stations.

In operation 330, measurement reporting information sent by the wireless backhaul base station is received, where the measurement reporting information includes the measurement result.

In operation 340, a donor base station capable of providing wireless backhaul services to the wireless backhaul base station is determined from among the designated donor base stations according to the measurement result, and the determined donor base station is configured as a secondary base station.

In an embodiment, the measurement result includes an RSRP measurement value or an RSRQ measurement value of each of the designated donor base stations. When operation 340 is performed, a donor base station capable of providing wireless backhaul services to the wireless backhaul base station may be determined according to the RSRP measurement value or the RSRQ measurement value of each of the designated donor base stations, and the determined donor base station is configured as the secondary base station. The determination method may be implemented in, but is not limited to, at least one of the following three manners.

The first manner includes selecting a maximum measurement value from the RSRP measurement values or the RSRQ measurement values of the designated donor base stations, and configuring the donor base station corresponding to the maximum measurement value as the secondary base station.

The second manner includes sorting the RSRP measurement values or the RSRQ measurement values of the designated donor base stations in descending order, selecting one or more relatively large measurement values, and configuring donor base station(s) corresponding to the one or more relatively large measurement values as the secondary base station.

The third manner includes selecting each measurement value greater than the first set threshold from the RSRP measurement values or the RSRQ measurement values of the designated donor base stations, and configuring the donor base station corresponding to each measurement value greater than the first set threshold as the secondary base station.

In an embodiment, the measurement result includes the load measurement value of each of the designated donor base stations. Accordingly, when operation 340 is performed, the donor base station capable of providing wireless backhaul services to the wireless backhaul base station is determined according to the load measurement value of each of the designated donor base stations, and the determined donor base station is configured as the secondary base station. The determination method may be implemented in, but is not limited to, at least one of the following three manners.

The first manner includes selecting a minimum measurement value from the load measurement values of the designated donor base stations, and configuring the donor base station corresponding to the minimum measurement value as the secondary base station.

The second manner includes sorting the load measurement values of the designated donor base stations in ascending order, selecting one or more relatively small measurement values, and configuring donor base station(s) corresponding to the one or more relatively small measurement values as the secondary base station.

The third manner includes selecting each measurement value smaller than the second set threshold from the load measurement values of the designated donor base stations, and configuring the donor base station corresponding to each measurement value smaller than the second set threshold as the secondary base station.

In an embodiment, the measurement result includes an RSRP measurement value or an RSRQ measurement value of each of the designated donor base stations, and the load measurement value of each of the designated donor base stations. Accordingly, when operation 340 is performed, the donor base station capable of providing wireless backhaul services to the wireless backhaul base station is determined according to the RSRP measurement value or the RSRQ measurement value of each of the designated donor base stations, and the load measurement value of each of the designated donor base stations, and the determined donor base station is configured as the secondary base station.

For example, a donor base station with a larger RSRP measurement value or a larger RSRQ measurement value and a smaller load measurement value is selected and configured as a secondary base station.

In the above embodiments, the measurement parameter used to measure each of the designated donor base stations is configured, the measurement parameter is sent to the wireless backhaul base station, and the measurement reporting information sent by the wireless backhaul base station is received, wherein the measurement reporting information includes the measurement result obtained by measuring each of the designated donor base stations through the wireless backhaul base station according to the measurement parameter; and the donor base station capable of providing wireless backhaul service for the wireless backhaul base station is determined from among the designated donor base stations according to the measurement result, and the determined donor base station is configured as the secondary base station. In this way, the accuracy of the secondary base station configuration is improved.

Figure 4:
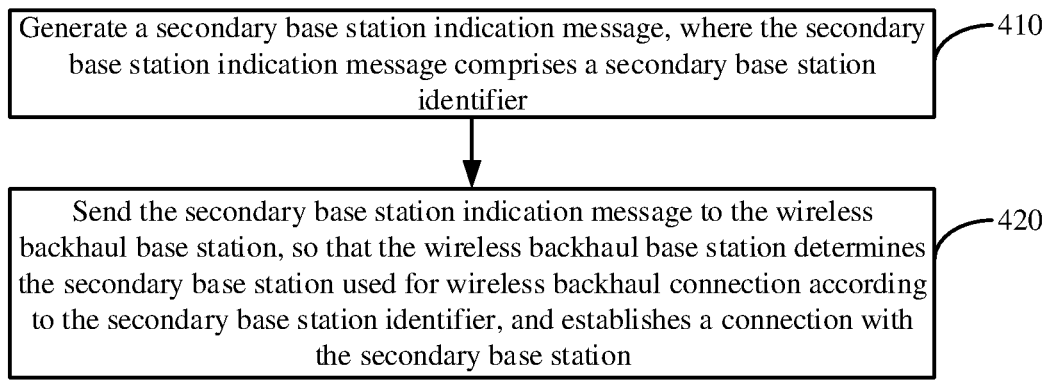
FIG. 4 is a flow chart of a method for wireless backhaul connection according to an exemplary embodiment.

FIG. 4 is a flow chart of a method for wireless backhaul connection according to an exemplary embodiment. The method for wireless backhaul connection may be applied in an LTE base station having a coverage within which a wireless backhaul base station is located. The method is based on the method shown in FIG. 1. As shown in FIG. 4, after operation 130 is performed, the following operations may be included.

In operation 410, a secondary base station indication message is generated, where the secondary base station indication message includes a secondary base station identifier.

In an embodiment, after configuring the secondary base station used for wireless backhaul connection for the wireless backhaul base station, the LTE base station may need to inform the wireless backhaul base station of the configured secondary base station. At this time, the secondary base station indication message may be used to inform the wireless backhaul base station of the configured secondary base station.

In operation 420, the secondary base station indication message is sent to the wireless backhaul base station, so that the wireless backhaul base station determines the secondary base station used for wireless backhaul connection according to the secondary base station identifier, and establishes a connection with the secondary base station.

In the above embodiment, a secondary base station indication message may be generated, wherein the secondary base station indication message includes the secondary base station identifier, and the secondary base station indication message may be sent to the wireless backhaul base station. In this way, the wireless backhaul base station may determine the secondary base station used for the wireless backhaul connection according to the secondary base station identifier, and establish a connection with the secondary base station, thereby improving the accuracy of the wireless backhaul connection.

Figure 5:
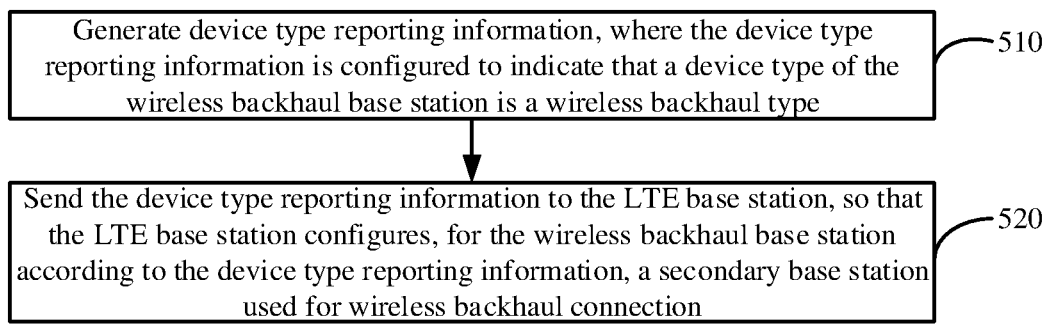
FIG. 5 is a flow chart of a method for wireless backhaul connection according to an exemplary embodiment.

FIG. 5 is a flow chart of a method for wireless backhaul connection according to an exemplary embodiment. The method for wireless backhaul connection may be applied in a wireless backhaul base station that is located within the coverage of the LTE base station. As shown in FIG. 5, the method for wireless backhaul connection includes the following operations.

In operation 510, device type reporting information is generated, where the device type reporting information is configured to indicate that the device type of the wireless backhaul base station is a wireless backhaul type.

In an embodiment, the LTE base station may be a macro base station with a wide coverage, and the wireless backhaul base station may be an NR small base station that can transmit data to core network device only by means of the LTE base station or the secondary base station configured by the LTE base station for the wireless backhaul base station.

When the wireless backhaul base station needs the secondary base station to assist in transmitting data, the wireless backhaul base station may generate device type reporting information configured to indicate that the device type of the wireless backhaul base station is the wireless backhaul type, so that the LTE base station may configure the secondary base station used for wireless backhaul connection for the wireless backhaul base station after receiving the device type reporting information.

In an embodiment, the wireless backhaul base station may send the device type reporting information to the LTE base station during the random access process initiated for the LTE base station.

For example, the device type reporting information is added into a random access request message, and the random access request message is sent to the LTE base station.

In an embodiment, the wireless backhaul base station may send the device type reporting information to the LTE base station after the random access process initiated for the LTE base station is completed.

For example, the device type reporting information is added into the RRC message, and the RRC message is sent to the LTE base station.

In operation 520, the device type reporting information is sent to the LTE base station, so that the LTE base station configures, for the wireless backhaul base station according to the device type reporting information, the secondary base station used for the wireless backhaul connection.

In the above embodiment, device type reporting information is generated, wherein the device type reporting information is configured to indicate that the device type of the wireless backhaul base station is the wireless backhaul type, and the device type reporting information is sent to the LTE base station. In this way, the LTE base station may configure, for the wireless backhaul base station according to the device type reporting information, the secondary base station used for wireless backhaul connection, thus the wireless backhaul base station may transmit data to the core network device by means of the secondary base station configured by the LTE, thereby improving the reliability of the wireless backhaul connection, and improving the data transmission efficiency of the wireless backhaul base station.

Figure 6:
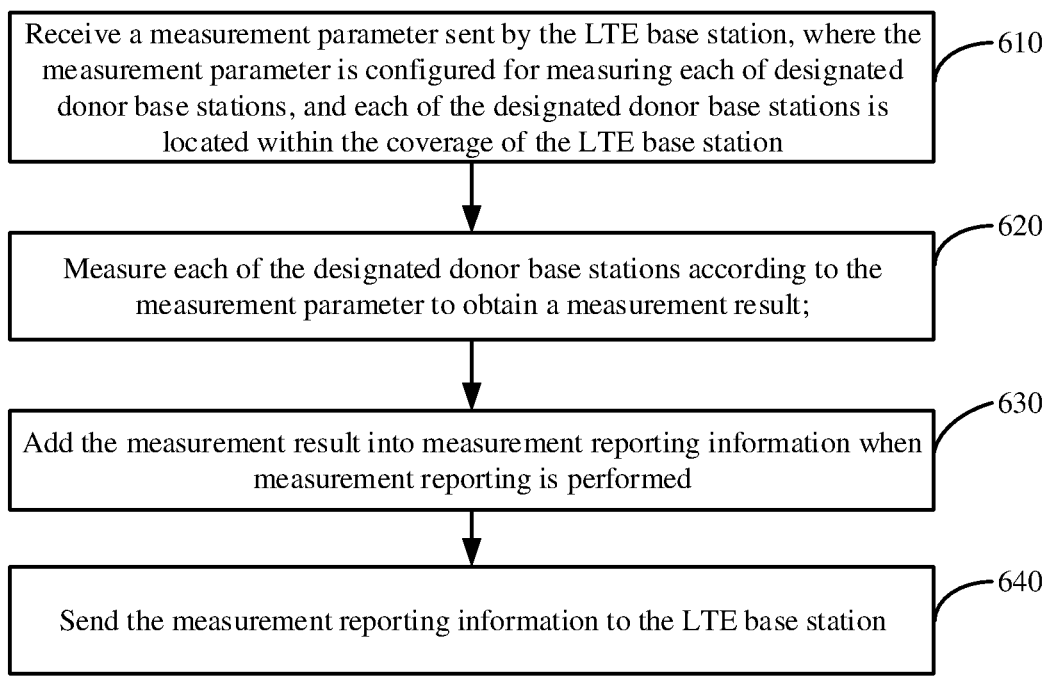
FIG. 6 is a flow chart of a method for wireless backhaul connection according to an exemplary embodiment.

FIG. 6 is a flow chart of a method for wireless backhaul connection according to an exemplary embodiment. The method for wireless backhaul connection may be applied in a wireless backhaul base station that is located within the coverage of the LTE base station. This method is based on the method shown in FIG. 5. As shown in FIG. 6, the wireless backhaul base station may also need to be measured according to the measurement parameter configured by the LTE base station, and send the measurement result to the LTE base station for determining a donor base station capable of providing wireless backhaul services to the wireless backhaul base station, and configuring the determined donor base station as the secondary base station. The method may include the following operations.

In operation 610, a measurement parameter sent by the LTE base station is received, wherein the measurement parameter is configured to measure each of the designated donor base stations, and each of the designated donor base stations is located within the coverage of the LTE base station.

In an embodiment, the designated donor base stations may include all or a part of the donor base stations within the coverage of the LTE base station. Whether the designated donor base stations are all or a part of the donor base stations, may be determined autonomously by the LTE base station based on the actual situation.

In an embodiment, the measurement parameter may include at least one of: a list of designated donor base stations, the list of designated donor base stations including each of the designated donor base stations; measurement quantity of designated measurement; or a trigger condition for the designated measurement.

In an embodiment, the measurement quantity of the designated measurement in may include: an RSRP or an RSRQ.

In an embodiment, the measurement quantity of the designated measurement may include: a load size.

In an embodiment, the measurement quantity of the designated measurement may include: an RSRP or an RSRQ, and a load size.

In an embodiment, a trigger condition for the designated measurement includes triggering on a periodic basis or triggering by an event. The triggering on a periodic basis refers to triggering measurement reporting according to a certain time period, such as 1 minute; and the triggering by an event refers to triggering measurement reporting when a designated event happens, such as an RSRP measurement value or an RSRQ measurement value of a donor base station exceeds a certain threshold.

In operation 620, each of the designated donor base stations is measured according to the measurement parameter to obtain a measurement result.

In an embodiment, the measurement quantity of the designated measurement includes an RSRP or an RSRQ. Accordingly, the wireless backhaul base station measures the RSRP or RSRQ of each of the designated donor base stations, where the obtained measurement result includes the RSRP measurement value or the RSRQ measurement value of each of the designated donor base stations.

In an embodiment, the measurement quantity of the designated measurement includes the load size. Accordingly, the wireless backhaul base station measures the load size of each of the designated donor base stations, where the obtained measurement result includes the load measurement value of each of the designated donor base stations.

In an embodiment, the measurement quantity of the designated measurement includes an RSRP or an RSRQ and a load size. Accordingly, the wireless backhaul base station measures the RSRP or RSRQ and the load size of each of the designated donor base stations, where the obtained measurement result includes the RSRP measurement value or the RSRQ measurement value of each of the designated donor base stations, and the load measurement value of each of the designated donor base stations.

In operation 630, when the measurement reporting is performed, the measurement result is added into the measurement reporting information.

In an embodiment, since a trigger condition for the designated measurement may be a triggering on a periodic basis or a triggering by an event, when operation 630 is performed, the measurement result may be added into the measurement reporting information when the measurement reporting of the triggering on a periodic basis or the triggering by an event is performed.

In operation 640, the measurement reporting information is sent to the LTE base station.

In the above embodiments, the measurement parameter sent by the LTE base station is received, and each of the designated donor base stations is measured according to the measurement parameter to obtain the measurement result. When the measurement reporting is performed, the measurement result is added into the measurement reporting information, and the measurement reporting information is sent to the LTE base station. In this way, the LTE base station may determine the donor base station capable of providing wireless backhaul services to the wireless backhaul base station from among the designated donor base stations according to the measurement result, and configure the determined donor base station as the secondary base station, thereby improving the accuracy of the secondary base station configuration.

Figure 7:
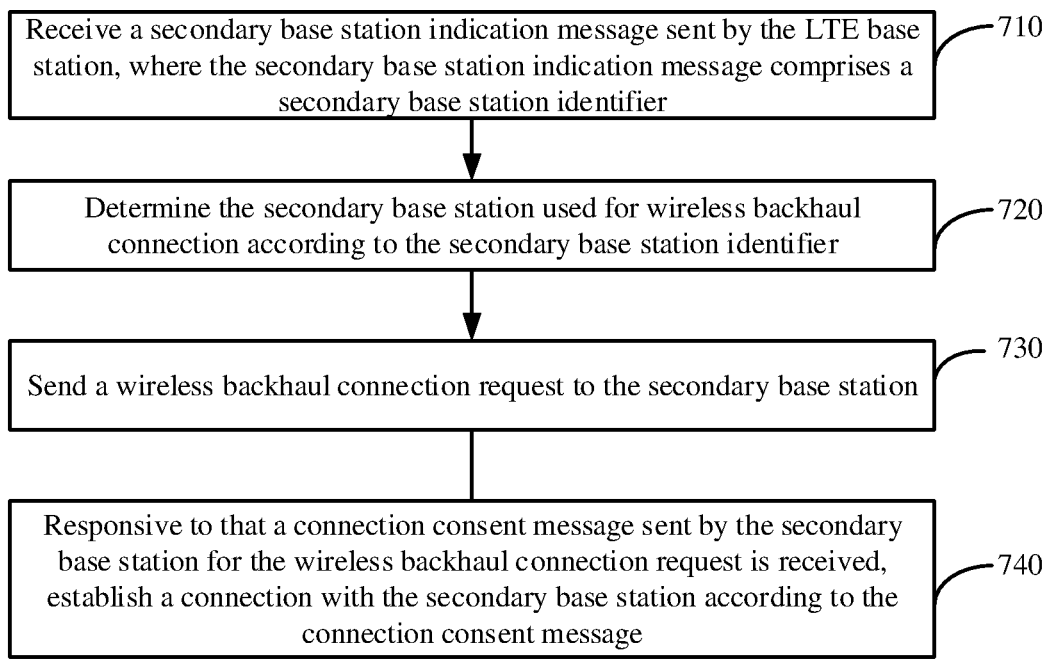
FIG. 7 is a flow chart of a method for wireless backhaul connection according to an exemplary embodiment.

FIG. 7 is a flow chart of a method for wireless backhaul connection according to an exemplary embodiment. The method for wireless backhaul connection may be applied in the wireless backhaul base station that is located within the coverage of the LTE base station. The method is based on the method shown in FIG. 5. As shown in FIG. 7, the method for wireless backhaul connection may further include the following operations.

In operation 710, a secondary base station indication message sent by the LTE base station is received, where the secondary base station indication message includes the secondary base station identifier.

In an embodiment, the secondary base station indication message is configured to indicate which secondary base station the LTE base station configures for the wireless backhaul base station.

In operation 720, the secondary base station used for the wireless backhaul connection is determined according to the secondary base station identifier.

In operation 730, a wireless backhaul connection request is sent to the secondary base station.

In operation 740, responsive to that a connection consent message sent by the secondary base station for the wireless backhaul connection request is received, a connection is established with the secondary base station according to the connection consent message.

In the above embodiment, the secondary base station indication message sent by the LTE base station is received, wherein the secondary base station indication message includes the secondary base station identifier; the secondary base station used for the wireless backhaul connection is determined according to the secondary base station identifier, and the wireless backhaul connection request is sent to the secondary base station; responsive to that a connection consent message sent by the secondary base station for the wireless backhaul connection request is received, a connection with the secondary base station is established according to the connection consent message, thereby improving the accuracy of the wireless backhaul connection.

Corresponding to the foregoing embodiments of the method for wireless backhaul connection, the present disclosure also provides embodiments of the apparatus for wireless backhaul connection.

Figure 8:
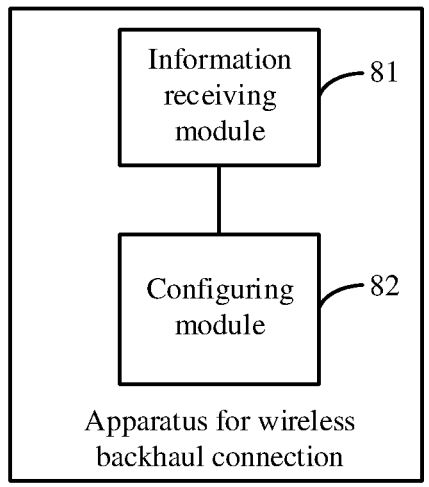
FIG. 8 is a block diagram of an apparatus for wireless backhaul connection according to an exemplary embodiment.

FIG. 8 is a block diagram of an apparatus for wireless backhaul connection according to an exemplary embodiment. The apparatus for wireless backhaul connection of the apparatus may be applied in an LTE base station having a coverage within which a wireless backhaul base station is located, and the apparatus is used to perform the method for wireless backhaul connection shown in FIG. 1. As shown in FIG. 8, the apparatus for wireless backhaul connection may include: an information receiving module 81, configured to receive device type reporting information sent by the wireless backhaul base station, wherein the device type reporting information is configured to indicate that the device type of the wireless backhaul base station is a wireless backhaul type; and a configuring module 82, configured to configure, for the wireless backhaul base station according to the device type reporting information, a secondary base station used for wireless backhaul connection.

In the above embodiment, the device type reporting information sent by the wireless backhaul base station is received, wherein the device type reporting information is configured to indicate that the device type of the wireless backhaul base station is a wireless backhaul type, and the secondary base station used for the wireless backhaul connection is configured for the wireless backhaul base station according to the device type reporting information. In this way, the wireless backhaul base station may transmit data to the core network device by means of the secondary base station configured by LTE, thereby improving the reliability of the wireless backhaul connection and improving the data transmission efficiency of the wireless backhaul base station.

Figure 9:
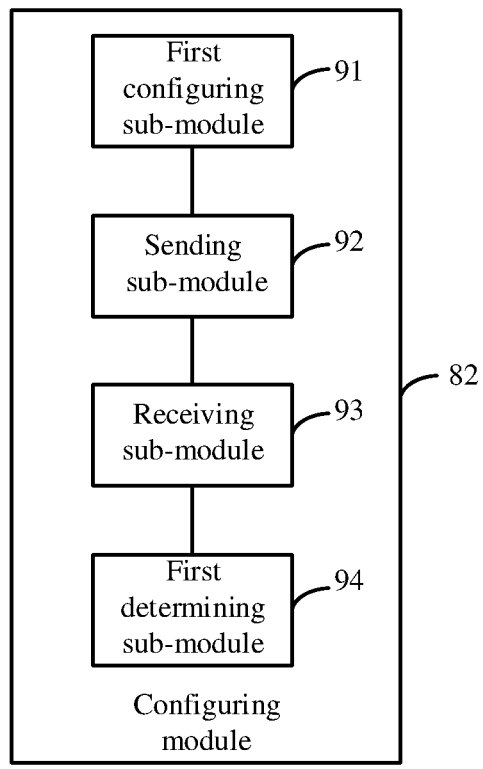
FIG. 9 is a block diagram of an apparatus for wireless backhaul connection according to an exemplary embodiment.

In an embodiment, based on the apparatus shown in FIG. 8, as shown in FIG. 9, the configuring module 82 may include: a first configuring sub-module 91, configured to configure a measurement parameter for measuring each of designated donor base stations, wherein each of the designated donor base stations is located within the coverage of the LTE base station; a sending sub-module 92, configured to send the measurement parameter to the wireless backhaul base station, so that the wireless backhaul base station measures each of the designated donor base stations according to the measurement parameter to obtain a measurement result; a receiving sub-module 93, configured to receive measurement reporting information sent by the wireless backhaul base station, wherein the measurement reporting information includes the measurement result; and a first determining sub-module 94, configured to determine a donor base station capable of providing wireless backhaul services to the wireless backhaul base station from among the designated donor base stations according to the measurement result, and configure the determined donor base station as the secondary base station.

In an embodiment, based on the apparatus shown in FIG. 9, the measurement parameter includes at least one of: a list of designated donor base stations, the list of designated donor base stations includes each of the designated donor base stations; measurement quantity of designated measurement; or a trigger condition for the designated measurement.

In an embodiment, the measurement quantity of the designated measurement includes an RSRP or an RSRQ.

Figure 10:
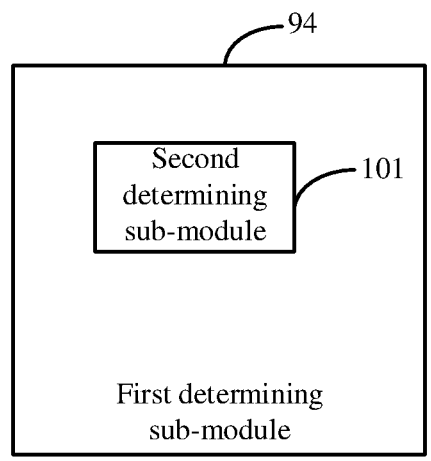
FIG. 10 is a block diagram of an apparatus for wireless backhaul connection according to an exemplary embodiment.

In an embodiment, the measurement result includes an RSRP measurement value or an RSRQ measurement value of each of the designated donor base stations. As shown in FIG. 10, the first determining sub-module 94 may include: a second determining sub-module 101, configured to determine a donor base station capable of providing wireless backhaul services to the wireless backhaul base station according to the RSRP measurement value or the RSRQ measurement value of each of the designated donor base stations, and configure the determined donor base station as the secondary base station. The determination method may be implemented in, but is not limited to the following three manners. The first manner includes selecting a maximum measurement value from the RSRP measurement values or the RSRQ measurement values of the designated donor base stations, and configuring the donor base station corresponding to the maximum measurement value as the secondary base station. The second manner includes sorting the RSRP measurement values or the RSRQ measurement values of the designated donor base stations in descending order, selecting one or more relatively large measurement values, and configuring donor base station(s) corresponding to the one or more relatively large measurement values as the secondary base station. The third manner includes selecting each measurement value greater than the first set threshold from the RSRP measurement values or the RSRQ measurement values of the designated donor base stations, and configuring the donor base station corresponding to each measurement value greater than the first set threshold as the secondary base station.

In an embodiment, the measurement quantity of the designated measurement includes a load size.

Figure 11:
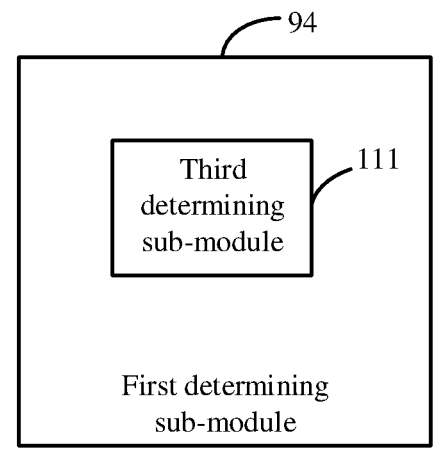
FIG. 11 is a block diagram of an apparatus for wireless backhaul connection according to an exemplary embodiment.

In an embodiment, the measurement result includes the load measurement value of each of the designated donor base stations. As shown in FIG. 11, the first determining sub-module 94 may include: a third determining sub-module 111, configured to determine a donor base station capable of providing wireless backhaul services to the wireless backhaul base station according to the load measurement value of each of the designated donor base stations, and configure the determined donor base station as the secondary base station. The determination method may be implemented in, but is not limited to, the following three manners. The first manner includes selecting a minimum measurement value from the load measurement values of the designated donor base stations, and configuring the donor base station corresponding to the minimum measurement value as the secondary base station. The second manner includes sorting the load measurement values of the designated donor base stations in ascending order, and selecting one or more relatively small measurement values, and configuring donor base station(s) corresponding to the one or more relatively small measurement values as the secondary base station. The third manner includes selecting each measurement value smaller than the second set threshold from the load measurement values of the designated donor base stations, and configuring the donor base station corresponding to each measurement value smaller than the second set threshold as the secondary base station.

Figure 12:
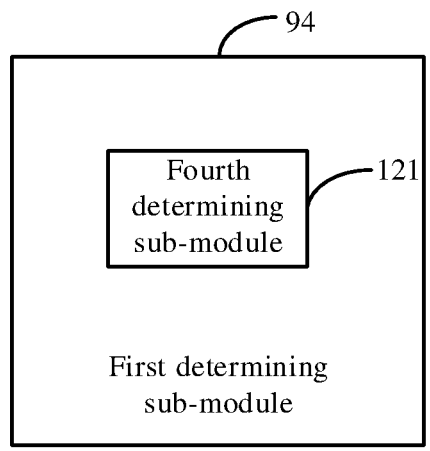
FIG. 12 is a block diagram of an apparatus for wireless backhaul connection according to an exemplary embodiment.

In an embodiment, the measurement quantity of the designated measurement includes an RSRP or an RSRQ and a load size; the measurement result includes the RSRP measurement value or the RSRQ measurement value of each of the designated donor base stations, and the load measurement value of each of the designated donor base stations. As shown in FIG. 12, the first determining sub-module 94 may include: a fourth determining sub-module 121, configured to determine a donor base station capable of providing wireless backhaul services to the wireless backhaul base station according to the RSRP measurement value or the RSRQ measurement value of each of the designated donor base stations, and the load measurement value of each of the designated donor base stations, and configure the determined donor base station as the secondary base station. For example, a donor base station with a larger RSRP measurement value or a larger RSRQ measurement value and a smaller load measurement value is selected and configured as the secondary base station.

In an embodiment, a trigger condition for the designated measurement includes triggering on a periodic basis or triggering by an event. The triggering on a periodic basis refers to triggering measurement reporting according to a certain time period, such as 1 minute; and the triggering by an event refers to measurement reporting when a designated event happens, such as an RSRP measurement value or an RSRQ measurement value of a donor base station exceeds a certain threshold.

In the above embodiment, the measurement parameter used to measure each of the designated donor base stations is configured, the measurement parameter is sent to the wireless backhaul base station, and the measurement reporting information sent by the wireless backhaul base station is received, wherein the measurement reporting information includes the measurement result obtained by measuring each of the designated donor base stations through the wireless backhaul base station according to the measurement parameter; and the donor base station capable of providing wireless backhaul service for the wireless backhaul base station is determined from among the designated donor base stations according to the measurement result, and the determined donor base station is configured as the secondary base station. In this way, the accuracy of the secondary base station configuration is improved.

Figure 13:
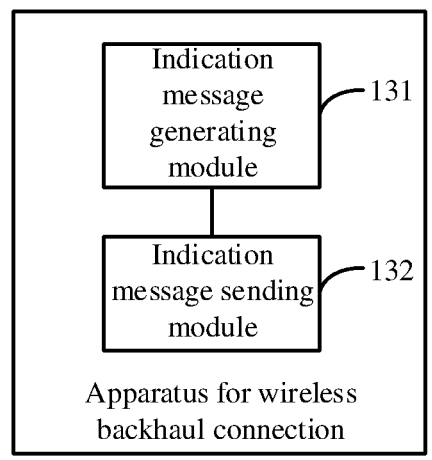
FIG. 13 is a block diagram of an apparatus for wireless backhaul connection according to an exemplary embodiment.

In an embodiment, based on the apparatus shown in FIG. 8, as shown in FIG. 13, the apparatus for wireless backhaul connection may further include: an indication message generating module 131, configured to generate a secondary base station indication message, wherein the secondary base station indication message includes a secondary base station identifier; and an indication message sending module 132, configured to send the secondary base station indication message to the wireless backhaul base station, so that the wireless backhaul base station determines a secondary base station used for wireless backhaul connection according to the secondary base station identifier, and establishes a connection with the secondary base station.

In the above embodiment, a secondary base station indication message may be generated, wherein the secondary base station indication message includes the secondary base station identifier, and the secondary base station indication message may be sent to the wireless backhaul base station. In this way, the wireless backhaul base station may determine the secondary base station used for the wireless backhaul connection according to the secondary base station identifier, and establish a connection with the secondary base station, thereby improving the accuracy of the wireless backhaul connection.

Figure 14:
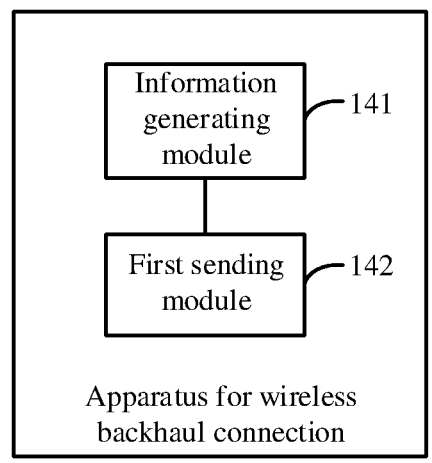
FIG. 14 is a block diagram showing an apparatus for wireless backhaul connection according to an exemplary embodiment.

FIG. 14 is a block diagram of an apparatus for wireless backhaul connection according to an exemplary embodiment. The apparatus is applied in a wireless backhaul base station that is located within a coverage of the LTE base station and is used to perform the method for wireless backhaul connection shown FIG. 5. As shown in FIG. 14, the apparatus for wireless backhaul connection may include: an information generating module 141, configured to generate device type reporting information, wherein the device type reporting information is configured to indicate that the device type of the wireless backhaul base station is a wireless backhaul type; and a first sending module 142, configured to send the device type reporting information to an LTE base station, so that the LTE base station configures the secondary base station used for wireless backhaul connection for the wireless backhaul base station according to the device type reporting information.

In the above embodiment, device type reporting information is generated, wherein the device type reporting information is configured to indicate that the device type of the wireless backhaul base station is the wireless backhaul type, and the device type reporting information is sent to the LTE base station. In this way, the LTE base station may configure, for the wireless backhaul base station according to the device type reporting information, the secondary base station used for wireless backhaul connection, thus the wireless backhaul base station may transmit data to the core network device by means of the secondary base station configured by the LTE, thereby improving the reliability of the wireless backhaul connection, and improving the data transmission efficiency of the wireless backhaul base station.

Figure 15:
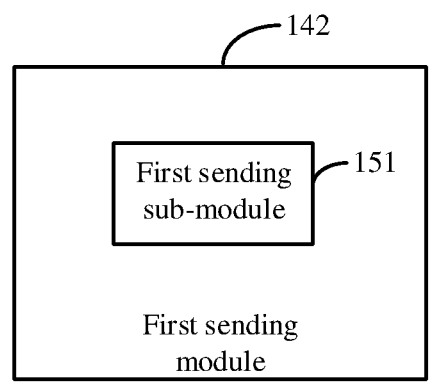
FIG. 15 is a block diagram of an apparatus for wireless backhaul connection according to an exemplary embodiment.

In an embodiment, based on the apparatus shown in FIG. 14, as shown in FIG. 15, the first sending module 142 may include: a first sending sub-module 151, configured to send the device type reporting information to the LTE base station during a random access process initiated for the LTE base station.

Figure 16:
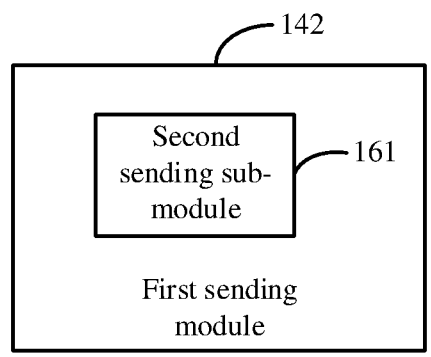
FIG. 16 is a block diagram of an apparatus for wireless backhaul connection according to an exemplary embodiment.

In an embodiment, based on the apparatus shown in FIG. 14, as shown in FIG. 16, the first sending module 142 may include: a second sending sub-module 161, configured to send the device type reporting information to the LTE base station after a random access process initiated for the LTE base station is completed.

Figure 17:
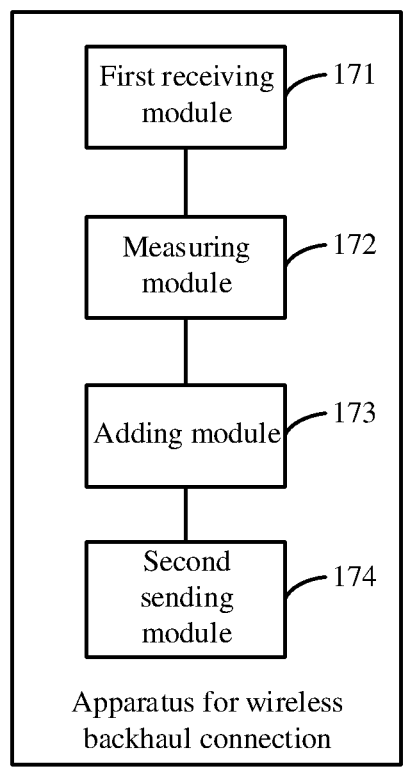
FIG. 17 is a block diagram of an apparatus for wireless backhaul connection according to an exemplary embodiment.

In an embodiment, based on the apparatus shown in FIG. 14, as shown in FIG. 17, the apparatus for wireless backhaul connection may further include: a first receiving module 171, configured to receive measurement parameter sent by the LTE base station, wherein the measurement parameter is used to measure each of the designated donor base stations, and each of the designated donor base stations is located within a coverage of the LTE base station; a measuring module 172, configured to measure each of the designated donor base stations according to the measurement parameter to obtain a measurement result; an adding module 173, configured to add the measurement result to measurement reporting information when the measurement reporting is performed; and a second sending module 174, configured to send the measurement reporting information to the LTE base station.

In an embodiment, based on the apparatus shown in FIG. 17, the measurement parameter includes at least one of: a list of designated donor base stations, the list of designated donor base stations includes each of the designated donor base stations; measurement quantity of designated measurement; or a trigger condition for the designated measurement.

Figure 18:
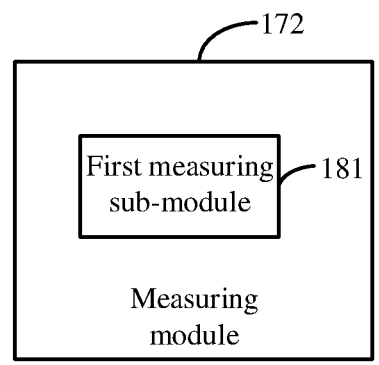
FIG. 18 is a block diagram of an apparatus for wireless backhaul connection according to an exemplary embodiment.

In an embodiment, the measurement quantity of the designated measurement includes an RSRP or an RSRQ. As shown in FIG. 18, the measuring module 172 may include: a first measuring sub-module 181, configured to measure the RSRP or the RSRQ of each of the designated donor base stations, where the obtained measurement result includes an RSRP measurement value or an RSRQ measurement value of each of the designated donor base stations.

Figure 19:
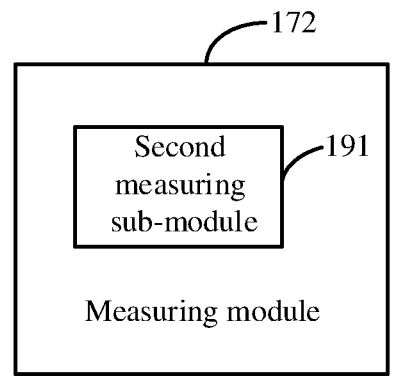
FIG. 19 is a block diagram of an apparatus for wireless backhaul connection according to an exemplary embodiment.

In an embodiment, the measurement quantity of the designated measurement includes a load size. As shown in FIG. 19, the measuring module 172 may include: a second measuring sub-module 191, configured to measure the load size of each of the designated donor base stations, where the obtained measurement result includes a load measurement value of each of the designated donor base stations.

Figure 20:
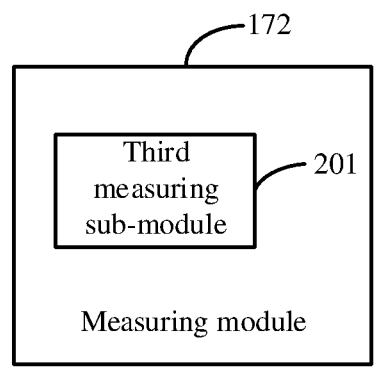
FIG. 20 is a block diagram of an apparatus for wireless backhaul connection according to an exemplary embodiment.

In an embodiment, the designated measurement quantity includes an RSRP or an RSRQ, and a load size. As shown in FIG. 20, the measuring module 172 may include: a third measuring sub-module 201, configured to measure an RSRP or an RSRQ and the load size of each of the designated donor base stations, where the obtained measurement result includes an RSRP measurement value or an RSRQ measurement value of each of the designated donor base stations and a load measurement value of each of the designated donor base stations.

Figure 21:
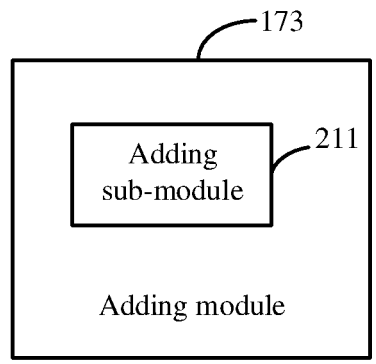
FIG. 21 is a block diagram of an apparatus for wireless backhaul connection according to an exemplary embodiment.

In an embodiment, a trigger condition for the designated measurement includes triggering on a periodic basis or triggering by an event. As shown in FIG. 21, the adding module 173 may include: an adding sub-module 211, configured to add the measurement result to the measurement reporting information when the measurement reporting of the triggering on a periodic basis or the triggering by an event is performed.

In the above embodiment, the measurement parameter sent by the LTE base station is received, and each of the designated donor base stations is measured according to the measurement parameter to obtain the measurement result. When the measurement reporting is performed, the measurement result is added into the measurement reporting information, and the measurement reporting information is sent to the LTE base station. In this way, the LTE base station may determine the donor base station capable of providing wireless backhaul services to the wireless backhaul base station from among the designated donor base stations according to the measurement result, and configure the determined donor base station as the secondary base station, thereby improving the accuracy of the secondary base station configuration.

Figure 22:
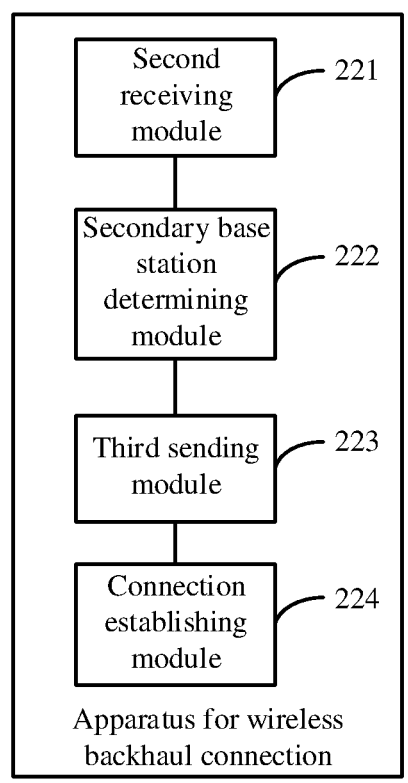
FIG. 22 is a block diagram of an apparatus for wireless backhaul connection according to an exemplary embodiment.

In an embodiment, based on the apparatus shown in FIG. 14, as shown in FIG. 22, the apparatus for wireless backhaul connection may further include: a second receiving module 221, configured to receive a secondary base station indication message sent by the LTE base station, wherein the secondary base station indication message includes a secondary base station identifier; a secondary base station determining module 222, configured to determine the secondary base station used for wireless backhaul connection according to the secondary base station identifier; a third sending module 223, configured to send a wireless backhaul connection request to the secondary base station; and a connection establishing module 224, configured to, responsive to that a connection consent message sent by the secondary base station for the wireless backhaul connection request is received, establish a connection with the secondary base station according to the connection consent message.

In the above embodiment, the secondary base station indication message sent by the LTE base station is received, wherein the secondary base station indication message includes the secondary base station identifier; the secondary base station used for the wireless backhaul connection is determined according to the secondary base station identifier, and the wireless backhaul connection request is sent to the secondary base station; responsive to that a connection consent message sent by the secondary base station for the wireless backhaul connection request is received, a connection with the secondary base station is established according to the connection consent message, thereby improving the accuracy of the wireless backhaul connection.

The apparatus embodiments correspond to the method embodiments. Reference may be made to the description of the method embodiments for related parts. The apparatus embodiments described above are merely illustrative. The modules described above as separate components may or may not be physically separate, and the components displayed as modules may or may not be physical units, that is, they may be located in one unit, or distributed to multiple networks. Some or all of the modules can be selected according to actual needs.

The present disclosure also provides a non-transitory computer-readable storage medium on which a computer program is stored, and the computer program is used to execute the method for wireless backhaul connection described in any one of FIGS. 1 to 4 above.

The present disclosure also provides a non-transitory computer-readable storage medium on which a computer program is stored, and the computer program is used to execute the method for wireless backhaul connection described in any one of FIGS. 5 to 7 above.

The present disclosure also provides an apparatus for wireless backhaul connection. The apparatus is applied in an LTE base station having a coverage within which a wireless backhaul base station is located, and the apparatus includes: a processor; and a memory for storing instructions executable by the processor; wherein the processor is configured to: receive device type reporting information sent by the wireless backhaul base station, wherein the device type reporting information is configured to indicate that the device type of the wireless backhaul base station is a wireless backhaul type; and configure a secondary base station used for wireless backhaul connection for the wireless backhaul base station according to the device type reporting information.

Figure 23:
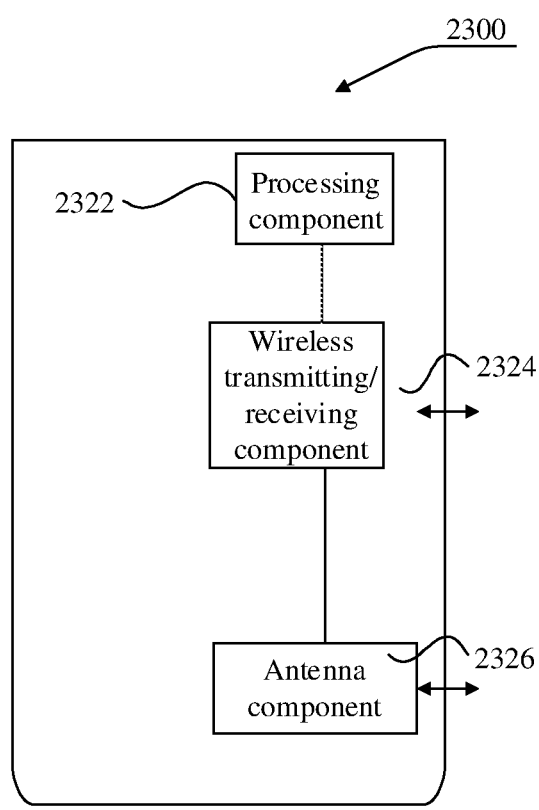
FIG. 23 is a schematic diagram of an apparatus for wireless backhaul connection according to an exemplary embodiment.

FIG. 23 is a schematic diagram of an apparatus 2300 for wireless backhaul connection according to an exemplary embodiment. The apparatus 2300 may be provided as an LTE base station. Referring to FIG. 23, the apparatus 2300 includes a processing component 2322, a wireless transmitting/receiving component 2324, an antenna component 2326, and a signal processing part corresponding to a wireless interface. The processing component 2322 may further include one or more processors.

One of the processors in the processing component 2322 may be configured to perform any of the above-mentioned methods for wireless backhaul connections.

The present disclosure also provides an apparatus for wireless backhaul connection, applied in a wireless backhaul base station that is located within a coverage of a Long Term Evolution (LTE) base station, and the apparatus includes: a processor; and a memory for storing instructions executable by the processor; wherein the processor is configured to: generate device type reporting information, wherein the device type reporting information is configured to indicate that the device type of the wireless backhaul base station is a wireless backhaul type; and send the device type reporting information to an LTE base station, so that the LTE base station configures the secondary base station used for wireless backhaul connection for the wireless backhaul base station according to the device type reporting information.

Figure 24:
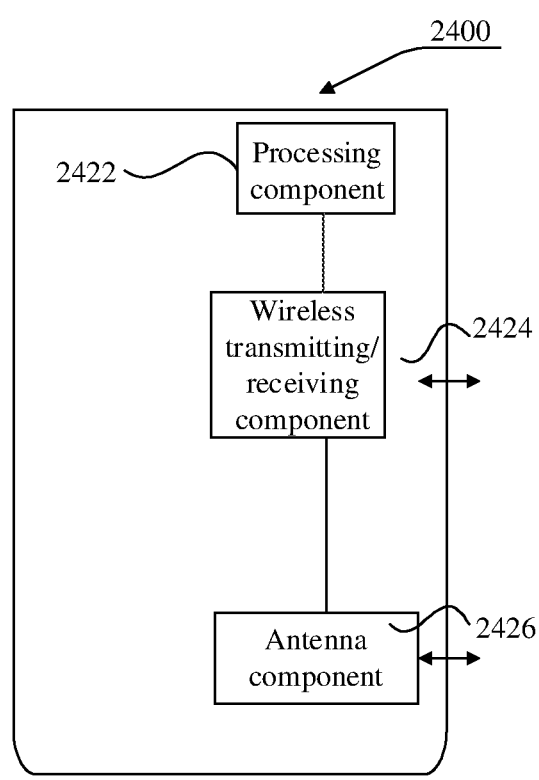
FIG. 24 is a schematic diagram of an apparatus for wireless backhaul connection according to an exemplary embodiment.

FIG. 24 is a schematic diagram of an apparatus 2400 for wireless backhaul connection according to an exemplary embodiment. The apparatus 2400 can be provided as a wireless backhaul base station. Referring to FIG. 24, the apparatus 2400 includes a processing component 2422, a wireless transmitting/receiving component 2424, an antenna component 2426, and a signal processing part corresponding to a wireless interface. The processing component 2422 may further include one or more processors.

One of the processors in the processing component 2422 may be configured to execute any of the method for wireless backhaul connections described above.

Other embodiments of the present disclosure will be apparent to those skilled in the art from considering the specification and practicing the disclosure. This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are exemplary, and the true scope and spirit of the present disclosure are indicated by the following claims.

It should be understood that the present disclosure is not limited to the precise structure described above and shown in the drawings, and various modifications and changes can be made without departing from its scope. The scope of the present disclosure is only limited by the appended claims.

What is claimed is:

1. A method for wireless backhaul connection, applied in a long-term evolution (LTE) base station, the method comprising:
    receiving device type reporting information sent by a wireless backhaul base station located in a coverage of the LTE base station, wherein the device type reporting information is configured to indicate that a device type of the wireless backhaul base station is a wireless backhaul type; and
    configuring, for the wireless backhaul base station according to the device type reporting information, a secondary base station used for the wireless backhaul connection, wherein configuring the secondary base station comprises:
    configuring a measurement parameter for measuring each of one or more designated donor base stations, wherein each of the designated donor base stations is located within the coverage of the LTE base station;
    sending the measurement parameter to the wireless backhaul base station, so that the wireless backhaul base station measures each of the designated donor base stations according to the measurement parameter to obtain a measurement result;
    receiving measurement reporting information sent by the wireless backhaul base station, wherein the measurement reporting information comprises the measurement result; and
    determining, according to the measurement result, a donor base station capable of providing wireless backhaul services to the wireless backhaul base station from among the designated donor base stations, and configuring a determined donor base station as the secondary base station.

2. The method of claim 1, wherein the measurement parameter comprises at least one of:
    a list of designated donor base stations, the list of designated donor base stations comprising each of the designated donor base stations;
    measurement quantity of designated measurement; or
    a trigger condition for the designated measurement.

3. The method of claim 2, wherein the measurement quantity of the designated measurement comprises at least one of a reference signal receiving power (RSRP) or a reference signal receiving quality (RSRQ).

4. The method of claim 3, wherein the measurement result comprises at least one of an RSRP measurement value or an RSRQ measurement value of each of the designated donor base stations, and determining, according to the measurement result, the donor base station capable of providing wireless backhaul services to the wireless backhaul base station from among the designated donor base stations, and configuring the determined donor base station as the secondary base station comprises:
    determining, according to the at least one of the RSRP measurement value or the RSRQ measurement value of each of the designated donor base stations, the donor base station capable of providing wireless backhaul services to the wireless backhaul base station, and configuring the determined donor base station as the secondary base station.

5. The method of claim 3, wherein the measurement quantity of the designated measurement further comprises a load size, the measurement result comprises at least one of an RSRP measurement value or an RSRQ measurement value of each of the designated donor base stations, and a load measurement value of each of the designated donor base stations, and determining, according to the measurement result, the donor base station capable of providing wireless backhaul services to the wireless backhaul base station from among the designated donor base stations, and configuring the determined donor base station as the secondary base station, comprises:

determining, according to the at least one of the RSRP measurement value or the RSRQ measurement value of each of the designated donor base stations and the load measurement value of each of the designated donor base stations, the donor base station capable of providing wireless backhaul services to the wireless backhaul base station, and configuring the determined donor base station as the secondary base station.

6. The method of claim 2, wherein the measurement quantity of the designated measurement comprises a load size.

7. The method of claim 6, wherein the measurement result comprises a load measurement value of each of the designated donor base stations, and determining, according to the measurement result, the donor base station capable of providing wireless backhaul services to the wireless backhaul base station from among the designated donor base stations, and configuring the determined donor base station as the secondary base station, comprises:

determining, according to the load measurement value of each of the designated donor base stations, the donor base station capable of providing wireless backhaul services to the wireless backhaul base station, and configuring the determined donor base station as the secondary base station.

8. The method of claim 1, after configuring the secondary base station used for wireless backhaul connection for the wireless backhaul base station, further comprising:

generating a secondary base station indication message, wherein the secondary base station indication message comprises a secondary base station identifier; and sending the secondary base station indication message to the wireless backhaul base station, so that the wireless backhaul base station determines the secondary base station used for wireless backhaul connection according to the secondary base station identifier, and establishes a connection with the secondary base station.

9. A method for wireless backhaul connection, applied in a wireless backhaul base station, the method comprising:

generating device type reporting information, wherein the device type reporting information is configured to indicate that a device type of the wireless backhaul base station is a wireless backhaul type; and sending the device type reporting information to a Long Term Evolution (LTE) base station, wherein the wireless backhaul base station is in a coverage of the LTE base station, and the LTE base station configures, for the wireless backhaul base station according to the device type reporting information, a secondary base station used for wireless backhaul connection, wherein the method further comprises:

receiving a measurement parameter sent by the LTE base station, wherein the measurement parameter is configured to measure each of one or more designated donor base stations, and each of the designated donor base stations is located within the coverage of the LTE base station;

measuring each of the designated donor base stations according to the measurement parameter to obtain a measurement result;

adding the measurement result into measurement reporting information when measurement reporting is performed; and sending the measurement reporting information to the LTE base station.

10. The method of claim 9, wherein sending the device type reporting information to the LTE base station comprises:

sending the device type reporting information to the LTE base station during a random access process initiated for the LTE base station.

11. The method of claim 9, wherein sending the device type reporting information to an LTE base station comprises:

sending the device type reporting information to the LTE base station after a random access process initiated for the LTE base station is completed.

12. The method of claim 9, wherein the measurement parameter comprises at least one of:

a list of designated donor base stations, the list of designated donor base stations comprising each of the designated donor base stations;

measurement quantity of designated measurement; or a trigger condition for the designated measurement.

13. The method of claim 12, wherein the measurement quantity of the designated measurement comprises at least one of a reference signal receiving power (RSRP) or a reference signal receiving quality (RSRQ), and measuring each of the designated donor base stations according to the measurement parameter to obtain the measurement result comprises:

measuring the at least one of the RSRP or the RSRQ of each of the designated donor base stations, wherein the obtained measurement result comprises at least one of an RSRP measurement value or an RSRQ measurement value of each of the designated donor base stations.

14. The method of claim 12, wherein the measurement quantity of the designated measurement comprises a load size, and measuring each of the designated donor base stations according to the measurement parameter to obtain the measurement result comprises:

measuring the load size of each of the designated donor base stations, wherein the obtained measurement result comprises a load measurement value of each of the designated donor base stations.

15. The method of claim 12, wherein the measurement quantity of the designated measurement comprises an RSRP or an RSRQ, and a load size, and measuring each of the designated donor base stations according to the measurement parameter to obtain the measurement result comprises:

measuring at least one of the RSRP or the RSRQ and the load size of each of the designated donor base stations, wherein the obtained measurement result comprises at least one of an RSRP measurement value or an RSRQ measurement value of each of the designated donor base stations and a load measurement value of each of the designated donor base stations.

16. The method of claim 9, further comprising:

receiving a secondary base station indication message sent by the LTE base station, wherein the secondary base station indication message comprises a secondary base station identifier;

determining the secondary base station used for wireless backhaul connection according to the secondary base station identifier;

sending a wireless backhaul connection request to the secondary base station; and responsive to that a connection consent message sent by the secondary base station for the wireless backhaul connection request is received, establishing a connection with the secondary base station according to the connection consent message.

17. A long-term evolution (LTE) base station, comprising:

a processor; and a memory for storing instructions executable by the processor;

wherein the processor is configured to:

receive device type reporting information sent by a wireless backhaul base station located in a coverage of the LTE base station, wherein the device type reporting information is configured to indicate that a device type of the wireless backhaul base station is a wireless backhaul type; and configure, for the wireless backhaul base station according to the device type reporting information, a secondary base station used for the wireless backhaul connection, wherein in configuring the secondary base station, the processor is further configured to:

configure a measurement parameter for measuring each of one or more designated donor base stations, wherein each of the designated donor base stations is located within the coverage of the LTE base station;

send the measurement parameter to the wireless backhaul base station, so that the wireless backhaul base station measures each of the designated donor base stations according to the measurement parameter to obtain a measurement result;

receive measurement reporting information sent by the wireless backhaul base station, wherein the measurement reporting information comprises the measurement result; and determine, according to the measurement result, a donor base station capable of providing wireless backhaul services to the wireless backhaul base station from among the designated donor base stations, and configure a determined donor base station as the secondary base station.

18. A wireless backhaul base station, comprising:

a processor; and a memory for storing instructions executable by the processor;

wherein the processor is configured to perform the method of claim 9.

\* \* \* \* \*